(No Model.) 2 Sheets—Sheet 1.
W. A. TAYLOR.
STEAM SEPARATOR.
No. 426,880. Patented Apr. 29, 1890.
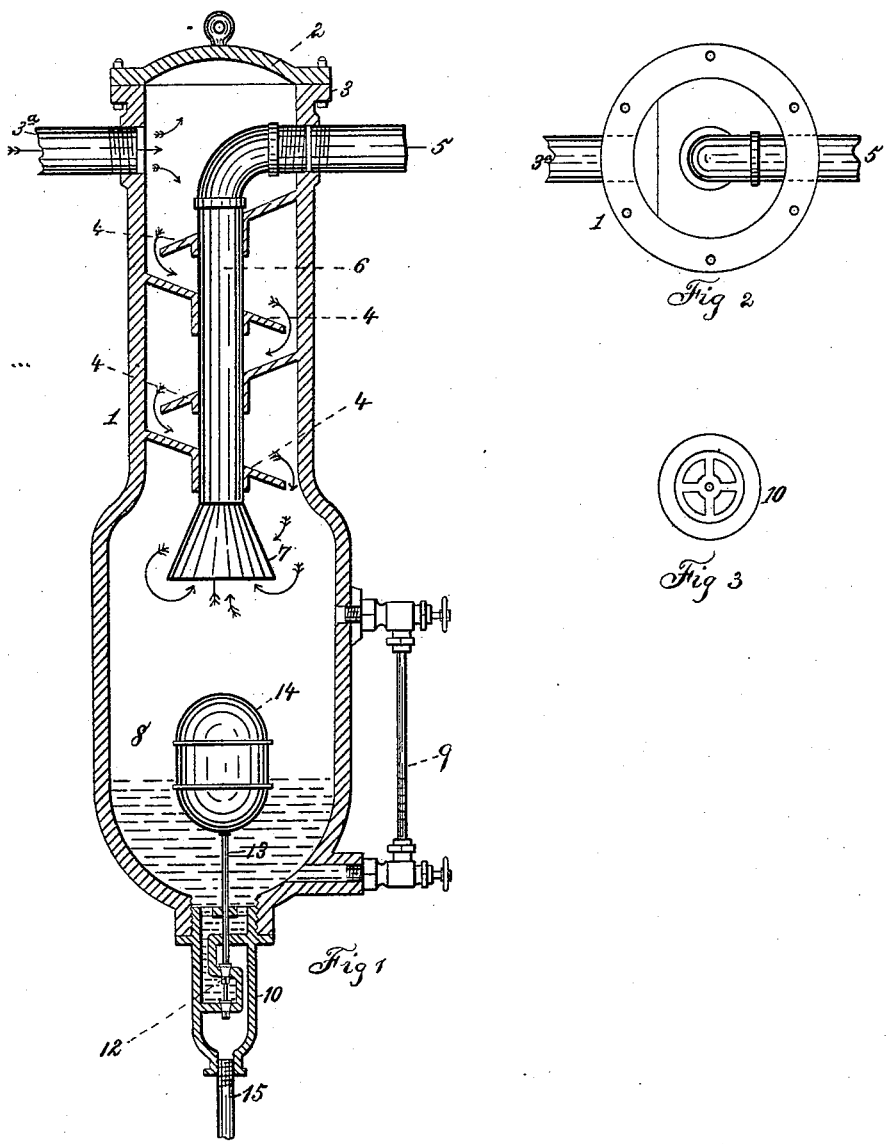
WITNESSES:
Robert Ries.
INVENTOR
Walter Anderson Taylor.
By Frederic Cook
Attorney.

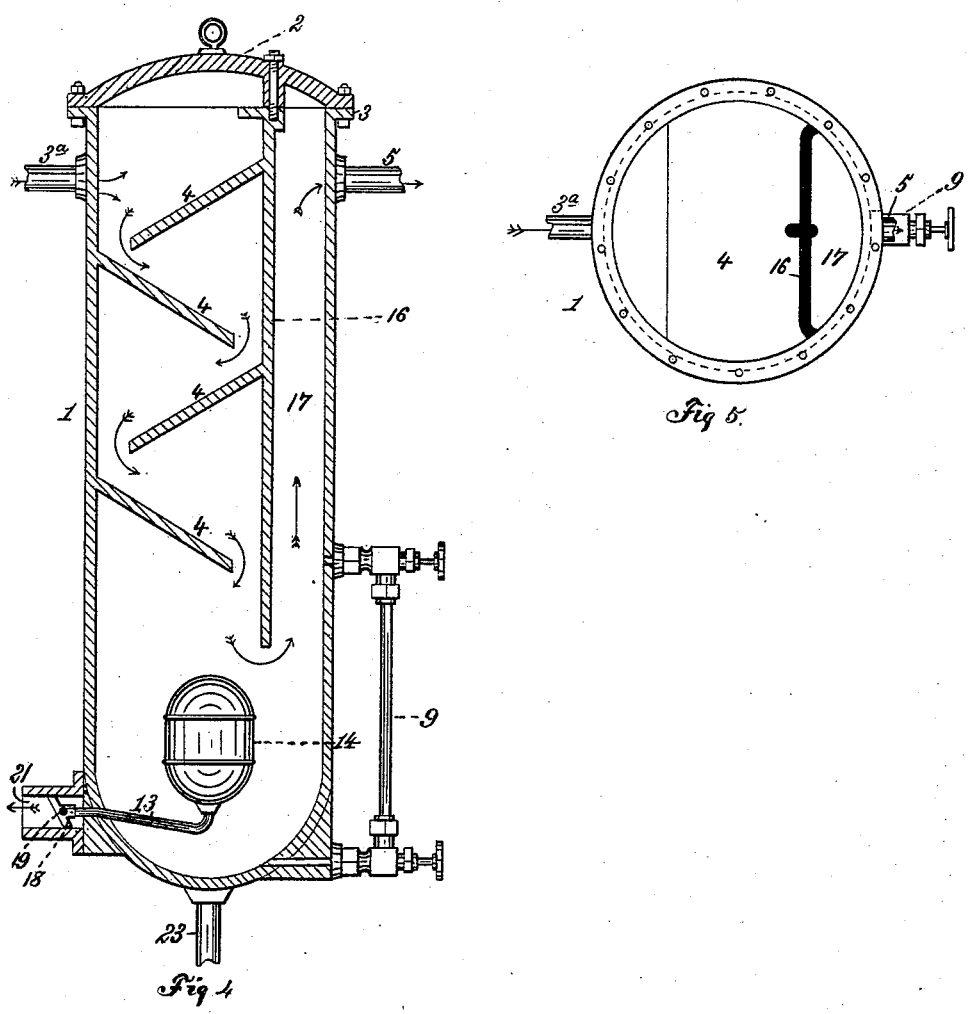

UNITED STATES PATENT OFFICE.

WALTER ANDERSON TAYLOR, OF NEW ORLEANS, LOUISIANA.

STEAM-SEPARATOR.

SPECIFICATION forming part of Letters Patent No. 426,880, dated April 29, 1890.

Application filed November 13, 1889. Serial No. 330,148. (No model.)

*To all whom it may concern:*

Be it known that I, WALTER ANDERSON TAYLOR, a citizen of the United States, residing at New Orleans, in the parish of Orleans and State of Louisiana, have invented certain new and useful Improvements in Steam-Separators; and I do hereby declare that the following is a full, clear, and exact description of the same, reference being had to the annexed drawings, making a part of this specification, and to the figures of reference marked thereon.

The object of my invention is to provide a novel apparatus for separating the water of condensation from live steam and eliminating therefrom the particles of grease, oil, or other impurities taken up by the steam in passing from the boiler to the steam-chests of the cylinders. To accomplish this object my invention involves the peculiar features of construction and the combination or arrangement of devices hereinafter described, and specifically set forth in the claims, reference being made to the accompanying drawings, in which—

Figure 1 is a central vertical section of a trap embodying my invention. Fig. 2 is a plan view of the same with the cap or cover removed. Fig. 3 is a top view of the valve-chamber. Fig. 4 is a vertical central section showing a modified construction. Fig. 5 is a plan view of Fig. 4, the cover being removed.

In the said drawings the reference-numeral 1 denotes a drum or vessel, preferably of cylindrical form, and of small diameter compared with its considerable depth. This drum is closed at its top by a cover 2, bolted to a flange 3, the joint being steam-tight.

The numeral 3ª denotes the steam-pipe, which enters the drum at or near the top. Formed or mounted upon the interior face of the drum are baffle-plates 4, having preferably a downward inclination, and projecting from opposite walls of the drum alternately, their edges approaching the wall opposite that on which they are mounted, but not meeting, in order that narrow passages may be left for the steam. Any required number of these baffle-plates may be used.

Entering the upper part of the drum above the baffle-plates 4 is a pipe 5, which communicates with a conveyer-tube 6, passing through or by the several plates 4 until its flaring or expanded mouth 7 drops somewhat below the lower plate. The pipe 5 leads to the steam-chest or other point to which the live steam is to be conveyed.

In the lower portion of the drum 1, which may be slightly expanded for the purpose, is the fluid and sediment chamber 8, which is supplied with a water-glass or gage-tube 9. Tapped into or otherwise attached to the bottom of this chamber is a valve-chamber 10, of any suitable construction, in which is arranged a balanced valve 12, carried by a stem 13, which rises into the chamber 8. Upon the valve-stem is mounted a float 14, of suitable size and form, by which the balanced valve may be unseated as the fluid rises in the chamber 8. The lower part of the valve-chamber 10 opens into a pipe 15, which may, if desired, be provided with a suitable cock. As the live steam enters by way of the pipe 3ª, it is compelled to flow downward over the surfaces of the baffle-plates 4, whereby any condensations of vapor or particles of oil or grease carried by it are deposited and caused to adhere to said plates, whence the fluid trickles downward and falls into the chamber 8, while the dry and pure steam enters the mouth of the conveyer 6 and passes to the engine. As the fluid accumulates in the chamber 8, the float is raised and a portion is discharged until the float falls sufficiently to seat the valve. If sediment accumulates in the chamber, the steam-pressure will ordinarily blow it out through the discharge-pipe.

I may substitute the modified construction shown in Fig. 4 in place of that described. In this form of trap the interior of the drum is provided with a partition or plate 16, which is arranged a little to one side of the center, as shown in Fig. 5, where it forms the vertical conveyer 17 for the steam. The baffle-plates 4 extend alternately from the plate or partition 16 and the opposite wall of the drum. It will be seen that this construction is in principle and operation the same as that already described.

In the bottom of the drum is arranged a balanced valve 18, mounted on a pivot 19, and having a stem 13 extending from the outlet 21, in which the valve is pivoted, into the lower part of the drum. On the stem is mounted the float 14. A separate blow-off pipe 23 is arranged in the bottom of the drum and provided with a cock of any suitable form. A water-glass is attached to the drum in the same manner as in the construction described. In this modified form the steam enters, as before, through the inlet-pipe $3^a$ and flows downward over the baffle-plates until it reaches the mouth of the conveyer or passage 17. Passing up through the latter it enters the pipe 5 and is conveyed to the engine.

What I claim is—

1. A steam-purifier consisting of a vertically-arranged closed drum having at its upper end a steam-inlet and a steam-outlet and at its lower end a valved water-discharge, a series of inclined baffle-plates alternately projecting past each other from opposite side portions of the drum and forming a zigzag steam-passage, a vertical steam-conveyer opening at its bottom beneath the lowermost baffle-plate and at its upper end connected with the steam-outlet, and a float sustained by the water in the base of the drum and connected with the valve in the water-discharge, substantially as described.

2. A steam-purifier consisting of a vertically-arranged tight drum having at its upper end a steam-inlet and a steam-outlet, a series of inclined baffle-plates alternately projecting past each other from opposite sides of the drum and each having an orifice, and a steam-conveyer tube extending vertically through the orifices in the baffle-plates, opening at its lower end beneath the lowermost plate and having its upper end connected with the steam-outlet, substantially as described.

3. A steam-purifier consisting of an upright drum having at its top a steam-inlet and a steam-outlet and at its bottom a valved water-discharge and blow-off, a series of baffle-plates alternately projecting past each other from opposite sides of the drum and each having an orifice, a vertical steam-conveyer tube extending through the orifices in the baffle-plates and connected with the steam-outlet, and a float sustained by the water in the base of the drum and connected with the valve, substantially as described.

In testimony whereof I have hereunto subscribed my name in the presence of two witnesses.

WALTER ANDERSON TAYLOR.

Witnesses:
 FREDERIC COOK,
 JAMES DAVIS.